United States Patent [19]

Kearney

[11] Patent Number: 5,544,686
[45] Date of Patent: Aug. 13, 1996

[54] DUST CONTROL SYSTEM

[75] Inventor: Ken Kearney, Alpha, Ill.

[73] Assignee: Agricultural Building Holdings, Inc., Mendota, Ill.

[21] Appl. No.: 333,843

[22] Filed: Nov. 3, 1994

[51] Int. Cl.$^6$ .................. B65B 1/30; B65B 3/28
[52] U.S. Cl. .................. 141/192; 141/198; 141/286; 141/326; 414/291; 414/572; 49/77.1
[58] Field of Search .................. 141/98, 99, 192, 141/196, 198, 227, 285, 286, 324, 325, 326, 364, 365, 95, 69; 414/291, 292, 376, 572; 222/502, 503, 484, 556; 49/51, 74.1, 77.1, 80.1, 82.1, 86.1

[56] References Cited

U.S. PATENT DOCUMENTS 1,433,644  10/1922  Palmer ........................ 49/86.1
5,205,696   4/1993  Andreasen .................... 222/503

Primary Examiner—Henry J. Recla
Assistant Examiner—Steven O. Douglas
Attorney, Agent, or Firm—Rockey, Rifkin & Ryther

[57] ABSTRACT

A dust control system and method for controlling the dust emitted into the atmosphere while dumping grain at a pit at grain elevators. The system includes a plurality of sections, including metering sections with sensing device and dump sections with louvers in each section which are opened and closed in response to predetermined signals. The predetermined signals may be electrically generated or manually applied to ensure that the proper louvers are opened or closed so that the air and dust in the pit does not escape into the atmosphere during the unloading of grain.

11 Claims, 5 Drawing Sheets

DUST CONTROL SYSTEM

BACKGROUND OF THE INVENTION

1. Field of the Invention

This invention relates to hopper assemblies for receiving from a wagon or truck granular and/or grains dumped into a pit for storage or removal from the base of the pit while controlling and containing the dust during dumping.

2. Related Art

It is well-known for a material, such as grain or other granular forms, to be delivered to grain elevators by trucks or wagons that pour the contents into a receiving hopper connected to a pit larger than the truck for rapid unloading. Most materials, such as grain and other granular materials, produce dust or have dust associated with them and the dust rises from the bottom of the pit in large quantities when a load of grain or granular material is dumped into the pit which may be 25 feet in depth. This dust cloud is formed by the granular material hitting the bottom of the pit, the force of the material loosens the dust and also forces the air upwardly as the air in the pit is replaced by the solid material.

It has been found that such dust is detrimental to the health of operators and the farmers or deliverers, who are exposed to this excess dust as material is dumped into a pit. The Illinois EPA has found that such dust emissions must be controlled. This invention has been found by the Illinois EPA to control particulate matter and improve the opacity readings of the surrounding air when installed and operated in pit situations.

It has been found that if this system is properly installed, the Illinois Environmental Protection Agency will accept this system as an equivalent compliance system for control of particular matter emissions at a major dump pit area in accordance with Section 212,462(b)(2) of Title 35: Subtitle B, Chapt. 1 of the Illinois Pollution Control Board Rules and Regulations.

It has been proposed to solve this dust problem prior to this invention by extracting dust laden air from the hopper or pit through filters, but this system has never been satisfactory because of the size of the pits and the large volume flow of air, which must be extracted and filtered.

Other solutions, which have been proposed, include pivotly moving baffles of inverted "V" shaped cross-sections hanging under gravity, but these cross sections are subject to clogging thus jamming and permitting dust clouds to escape to the atmosphere.

Other solutions proposed have been to have an upwardly facing mouth and including, resiliently flexible baffles extending downward from a fixed horizontal extending top edge portion, to a free edge portion. Such a system is subject to failure when large amounts of material, such as coming from a truck loaded with grain, are dumped into the pit at a rapid rate.

According to this invention, the pit remains closed by a plurality of sections having a plurality of closed louvers covering the pit opening until a sufficient volume of material is loaded onto the metering section of the control system. When the material begins to flow, the flow is sensed by a sensor, which is adjustable to avoid false signals. A timing means is activated by the sensor, the timing means is also variable depending upon the rate of flow from the dumping vehicle. The time is set so that a substantial amount of grain or other material is on the louvers of the metering section before the metering section louvers are opened. This means that the metering section is choke loaded, i.e. the material is going into the solid mass preventing any air from escaping through the open metering section. All of the dump sections are closed and thus air and dust from the pit cannot escape into the general atmosphere. In as much as the metering section cannot completely handle the rate of dumping, material will spill or flow over and onto the dump sections even if the metering section is wide open.

This material that flows over onto the dump sections will be dumped later simultaneously and rapidly so that air and dust will not be able to escape from the pit. This dump section will open and close very rapidly, for example in 5 seconds.

Thus, the desirable characteristics of variable and controlled rates of flow and varied areas for filling the pit or dumping the grain are utilized to prevent the flow of dust from the pit to the ambient air.

BRIEF SUMMARY OF THE INVENTION

The invention provides the unique method of controlling the emission dust from a pit into which granular or grains are being dumped. Control of the dust is provided by the use of controlled metering sections and dumping sections which constitute a part of the cover for the pit.

It is an object of the invention to provide for rapid unloading of grain or granular materials into a pit while preventing the dust generated thereby being carried by the air in the pit from escaping into the atmosphere. It is also an object of the invention to provide a frame for the pit using the foregoing dump sections and metering sections to permit dumping at a plurality of selectable positions over the pit. It is also an objective of the invention to provide means for changing the size of the metering section to handle loads of various sizes and rates of discharge.

It is an object of the invention to provide a dust control system for open pit dumping, which is controlled by an operator, including automatic features for sensing the presence and flow of the grain to a metering system and opening the metering sections at a time subsequent to the sensing. The opening must not occur until the grain has completely covered the metering section.

The foregoing and other objects of the invention will become apparent from the following description of the preferred embodiment of the invention which is given here by way of example only with reference to the following drawings.

DETAILED DESCRIPTION OF THE DRAWINGS

Figure 1:
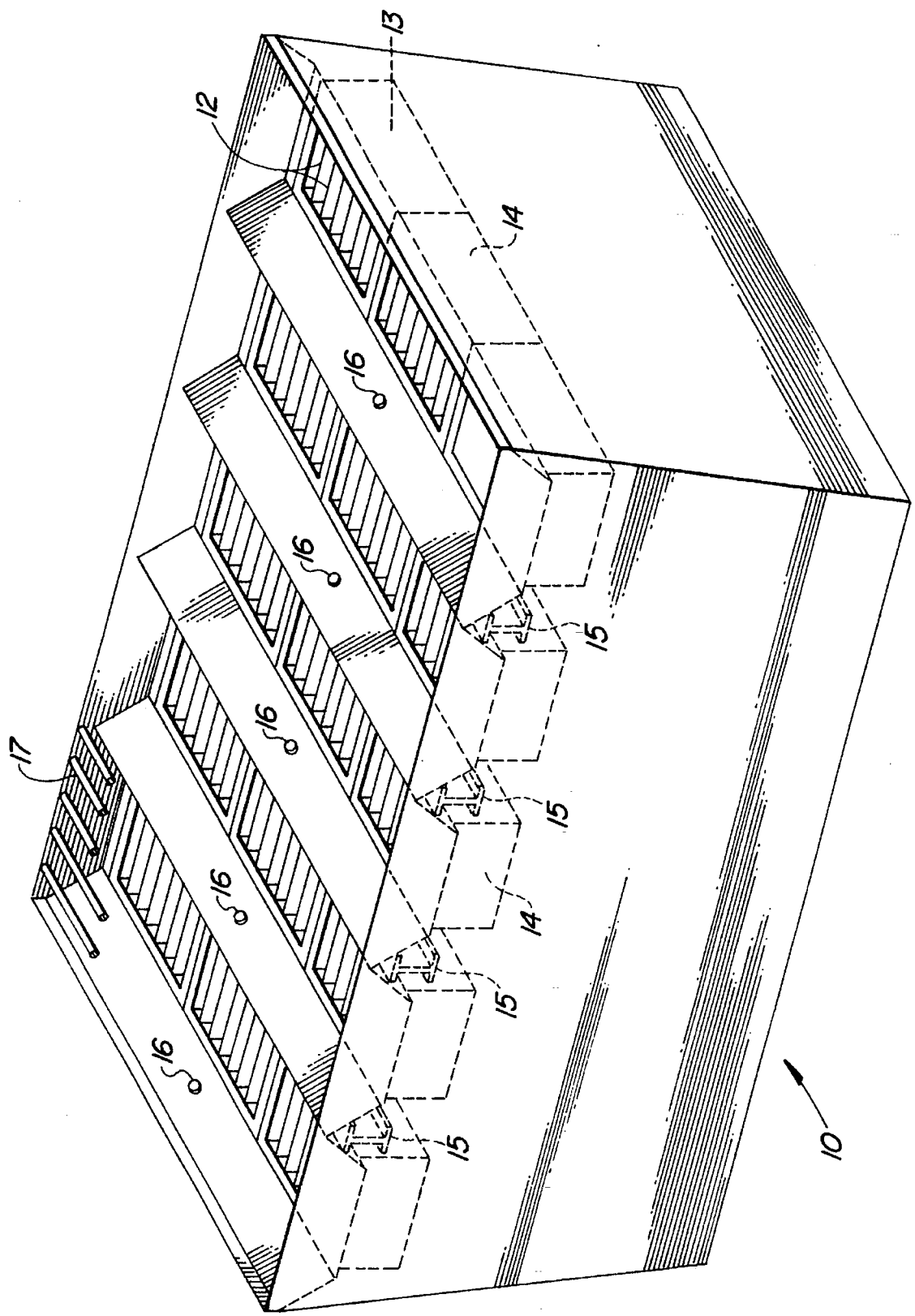
FIG. 1 is a perspective illustration showing the invention in position in a pit.

Referring now to FIG. 1, there is illustrated the perspective view of the invention which comprises a plurality of sections 13, called dump sections, and a plurality of sections 14, which are the metering sections of the invention. These sections 13 and 14 are all placed at the top of a pit 10 and are supported in position by a plurality of beams 15. These beams must be strong enough enable the truck or wagon unloading vehicle to drive over the invention and the pit 10 in order to dump its load into the pit 10. The pit 10 may be 25 feet high and have a grain unloading device at the bottom, which will remove the grain as it is dumped into the pit and then into the elevators, none of which is shown but all of which is well known in the art. The metering sections 14 may be strategically placed at any position but are normally, as shown in FIG. 1, at the middle of the two ends of the pit 10 and at one side in the middle of the pit 10. This permits the rapid unloading of either trucks using a back opening to unload onto the end metering sections 14 or side unloading wagons which would use the side metering sections 14 for primary unloading. Each metering section has a sensing means 16 for sensing the presence of the load as it is beginning to unload. This sensing means may be a proximity switch or other sensors which will sense the presence of a load. This switch should be adjustable so that it only operates when a load is being unloaded and the grain flow and accumulation will activate the switch.

Figure 2:
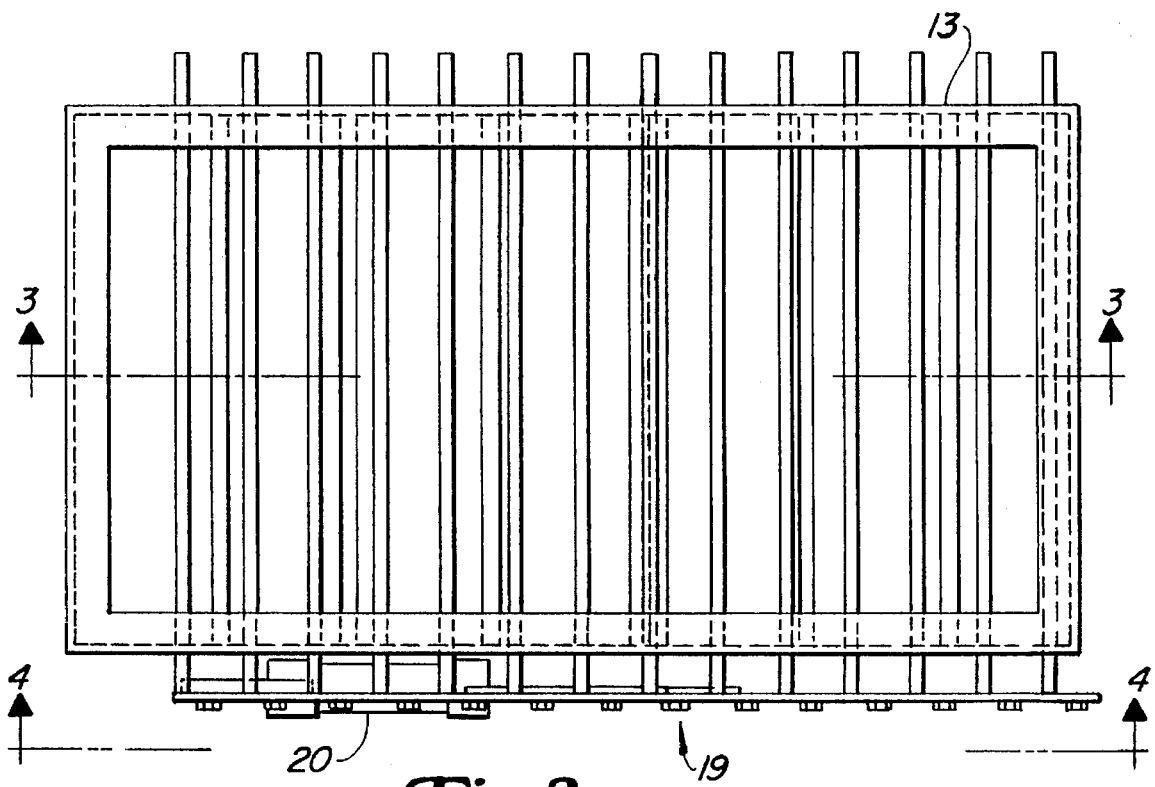
FIG. 2 is a top view of the invention.
Figure 3:
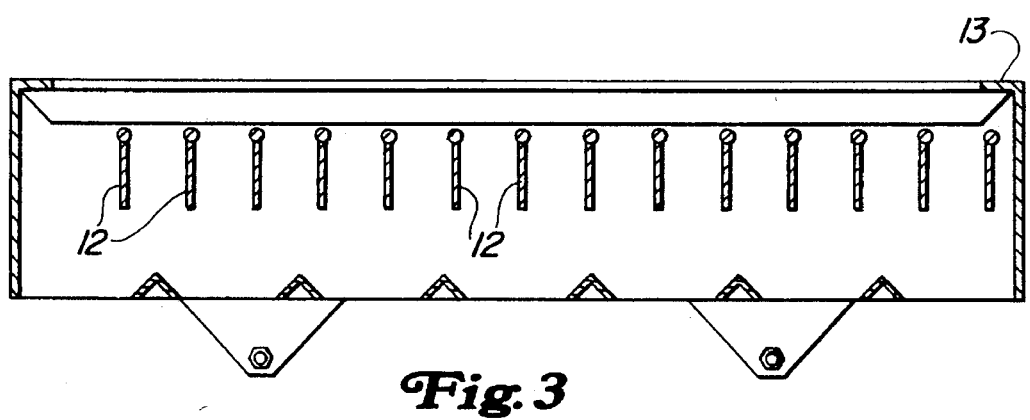
FIG. 3 is a cross-section view taken along the line 3—3 of FIG. 2.
Figure 4:
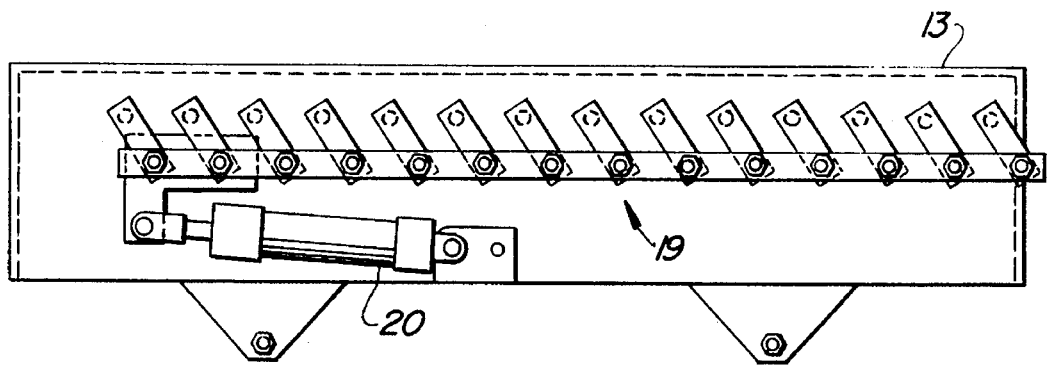
FIG. 4 is a cross-section view taken along lines of 4—4 of FIG. 2.

FIGS. 2, 3, and 4 illustrate a complete illustration of a dump section 13. In each dump section, all of the louvers 12 in the dump section 13 are operated together for opening and closing by the closing mechanism 19 and which may be operated by an air cylinder or a hydraulic cylinder 20 which is activated by switches on the control panel 80. The electrical connections and the air or hydraulic connections are not shown in the drawings, but may be of any conventional system and designed to perform the functions described herein.

Figure 5:
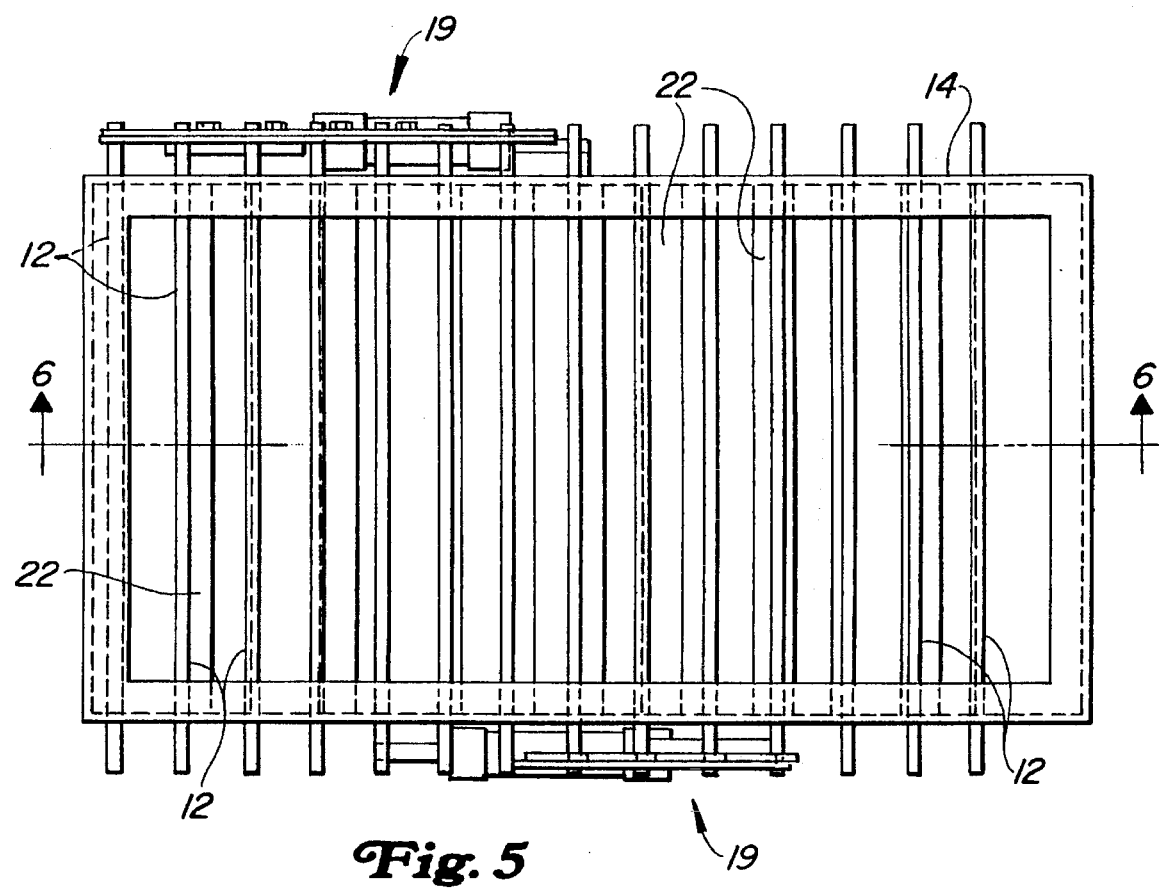
FIG. 5 is a top view of an installation of the invention, including the optional oiling mechanism.
Figure 6:
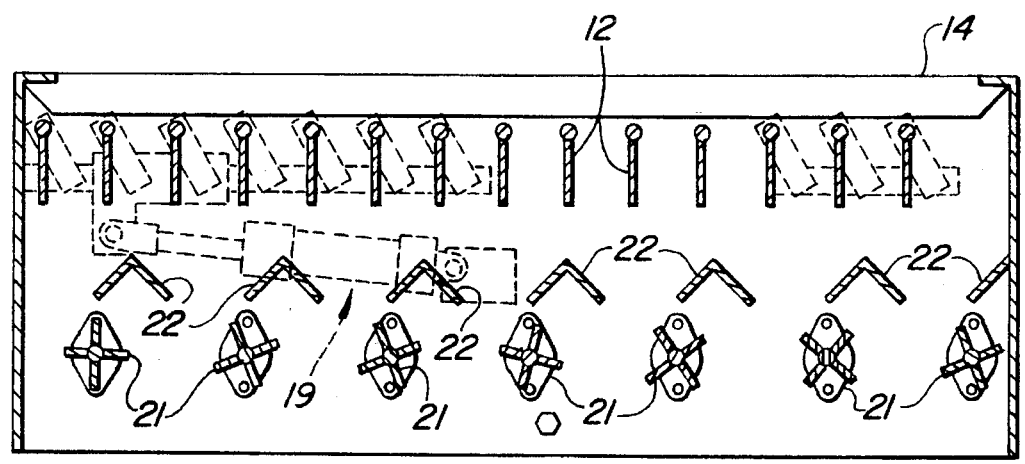
FIG. 6 is a view along lines 6—6 of FIG. 5.

As shown in FIGS. 5 and 6, the metering section 14 has a different configuration and only part of the louvers 12 are opened by the opening and closing mechanism 19 in this case because there are two controls, one control mechanism controls a part of the louvers of the metering section 14 and a second control mechanism controls the remaining louvers of the metering section 14. FIGS. 5 and 6 illustrate an optional oiling system for use with the dust control system of this invention. Oil is sprayed by nozzles 21 on to flow of grain to control dust and is limited by the Federal Regulations as to the amount of oil permitted.

Figure 7:
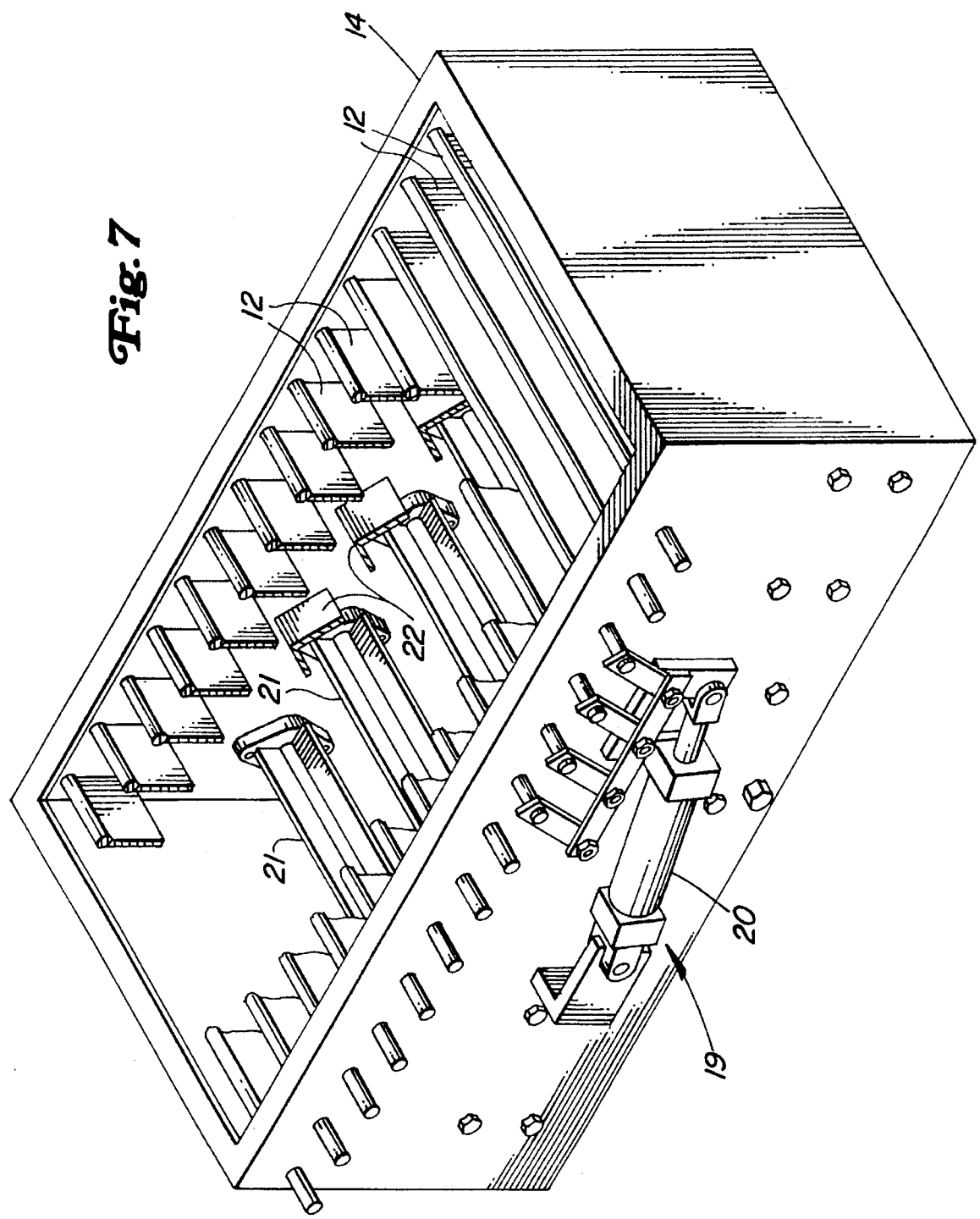
FIG. 7 is a perspective illustration of the installation showing the optional oiling mechanism for operation with the louvers on metering section when the louvers are open.

FIG. 7 shows a partially sectioned metering section 14 with the oil spraying devices 21 and protective panels 22 in position.

Figure 8:
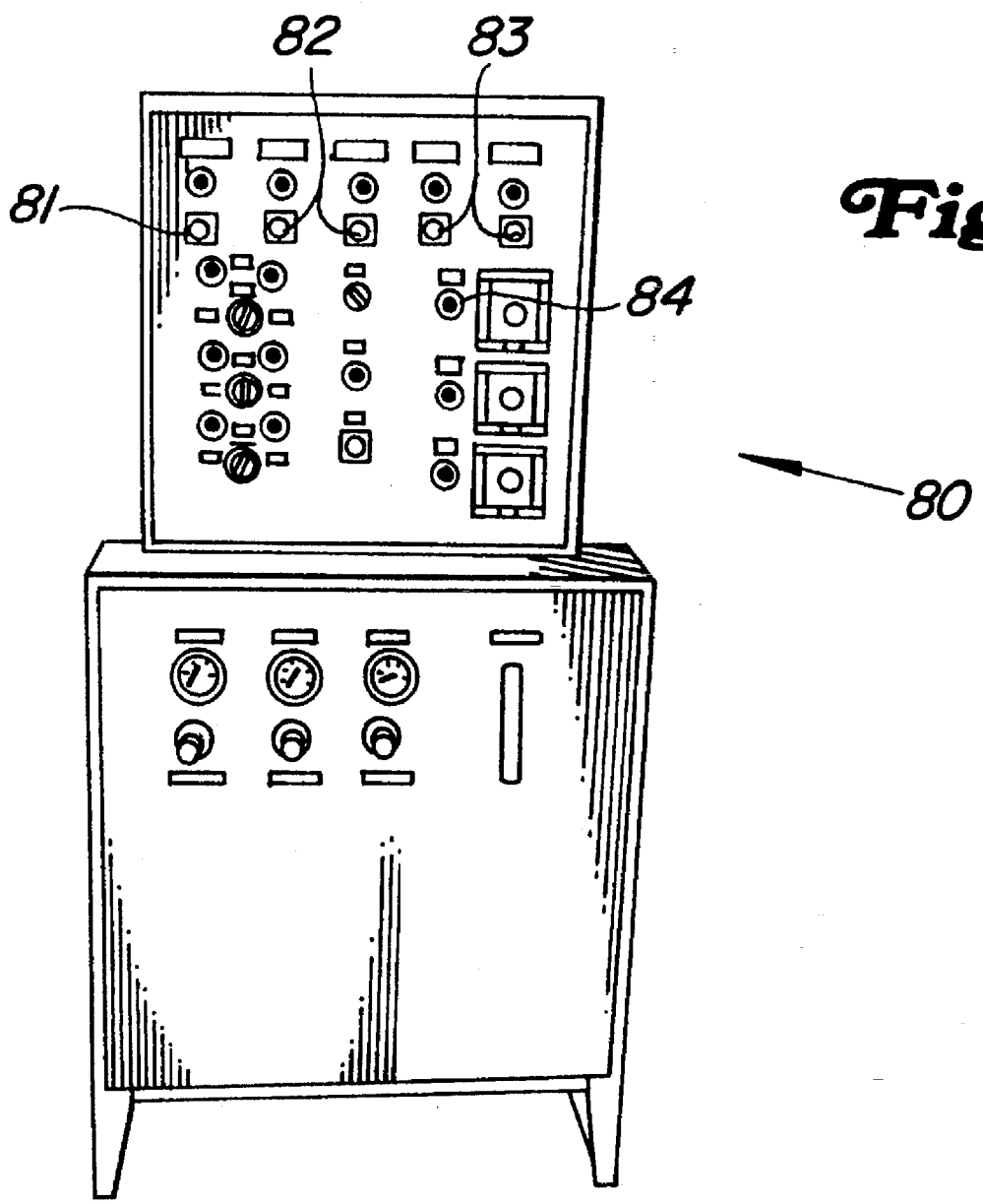
FIG. 8 is a perspective view of a control panel for the invention.

FIG. 8 shows the control panel 80 including a timing means 82 which may be set for variable times and is activated by the proximity switch 16 to activate the air or hydraulic oil to the opening mechanism 20 in the metering section 14. The timer 82 will open the louvers 12 of metering section 14 at the preset time the elapsed time has given the unloading of the grain time to have a pile of grain on the metering section 14 which is called the choke load. Switch 83 on the control panel 80 can be set to select either the large opening or a small opening for the metering section 14, i.e. it will either open a preselected number such as 7 for the small opening or a preselected of louvers such as 11 for the large opening. There is also a switch 84 on the control panel 80 which opens the louvers on all sections 13 and 14 to dump any grain left after the load has been completely emptied and the metering section closed. The metering section is automatically closed by the microswitches or the sensing means 16 when grain is no longer sensed grain coming from the load.

A complete sequence of the operation of this device will now be described including the oiling feature. In operation a truck or wagon full of grain drives over the pit 10, including the metering and dumping sections of this invention. There is normally a grate 17 covering these units or sections 13 and 14 of this invention and the pit 10. The truck is positioned over or as close as possible to a metering section 14. At this time operator turns on the power switch 81, which activates proximity switches or sensing devices 16 and at the same time provides the air from an air compressor or other sources to be activated and applied to the cylinders 20 for operating the mechanisms 19 for opening and closing louvers 12. The operator also at this time, sets the timing switches 82 which provide a delay from the sensing by proximity switches to opening of the louvers 12 in the metering section 14. This delay time is necessary to build up an adequate amount of grain on the metering section 14 so that when the louvers 12 are opened no air and/or dust will be able to escape through the mass of the grain flowing into the pit 10. Timing switch 82 will be set to ensure that an adequate choke load of grain is on the metering section 14 before the louvers 12 are opened. The operator also will set switch 83 for either a large or small door openings by number of louvers 12 in the metering section 14. The size of the door opening is determined by the load or the size of the vehicle gate which determines the rate of flow of grain from the vehicle to be transferred to the pit 10.

The operator now, having preset all these switches, tells the operator of the loaded vehicle to proceed to dump the grain. The grain begins to accumulate on metering sections 14 and the sensing means or proximity switches 16 sense the fact that there is grain present and activates the timing mechanism 82. When the preset time expires cylinders 20 are activated, opening the louvers 12 to permit the grain to fall into the pit. A large amount of grain piled upon the metering section 14 before opening of the louvers 12 precludes any dust in the air in the pit 10 from passing into the atmosphere. The remaining doors of the dump sections 13 and the metering sections 14 not being utilized, will remain closed so that only a very small amount of air or dust will escape from the pit 10 due to the dumping of the grain causing the dust and air within the pit 10 to circulate and be driven upward by replacement of a heavier mass.

When the load is unloaded and the sensing device or the proximity switches 16 may sense no more grain coming from the wagon or truck it closes the doors on the metering portion. Alternatively the metering door may remain open and the dumping louvers are opened to dump all the grain. Thus, sealing the pit 10 and retaining the dust in the pit 10. During the dump there has been a certain amount of spillage or overflow of grain onto some of the adjacent dump sections 13 and there also may be some grain remaining on the metering section. The operator then using the switch 84 opens all sections, the dump 13 and metering sections 14. There is a rate restriction means to control the flow of air to the opening devices 19 to insure that the louvers are opened gradually. This will create a minimum amount of dust from the dumping of the small amount of grain left. The final dump takes approximately 5 seconds and the louvers 12 then are closed and the pit 10 is sealed again and is ready for the next load.

The oil option, which will improve the dust removal but is not necessary, will operate as shown in FIGS. 5, 6 and 7 to spray oil on the grain as it passes into the pit 10. The amount of oil should not exceed Food and Drug Administration standards. The spray nozzles 21 in the pit 10 may be turned on automatically or by a separate switch on the control panel when the louvers 12 in the metering section 14 open. This will spray oil on the grain as it passes by the nozzles 21 into the pit 10. The spray will reduce the amount of dust on the grain and in the pit 10, which will improve the dust removal but is not necessary to the successful operation of the invention.

Having described the preferred embodiment, other features of the present invention will undoubtedly occur to those versed in the art, as will numerous modifications and alterations in the embodiments of the invention illustrated, all of which may be achieved without departing from the spirit and scope of the invention as defined in the appending claims.

What is claimed is:

1. A system for continuously controlling the emission of dust from a pit designed to have grain periodically dumped at high flow rates into the pit comprising:
    a) a pit;
    b) a plurality of units arranged to form a lid on said pit;
    c) said plurality of units, including at least one metering unit and at least one dumping unit;
    d) each of said units having a plurality of louvers;
    e) means on each of said units for opening and closing said louvers in said units;
    f) a first portion of the louvers in said metering section connected to a first one of said means for opening and closing said louvers and a second portion of said louvers connected to a second means for opening and closing said louvers;
    g) all louvers in said dumping unit connected to a single means for opening and closing said louvers;
    h) sensing means to generate a signal when grain is present on said units;
    i) said sensing means located on at least one of said metering units;
    j) means responsive to said signal from said sensing means to open said louvers on said metering unit after a predetermined time lapse;
    k) means to generate a signal sent to said units for opening all louvers on all units;
    l) said signal directed to all means for opening and closing said louvers in said units sent to said units; and
    m) means for generating a subsequent signal sent to said units to close all of said louvers whereby the dust is prevented from escaping the pit at all times including during the unloading of grain into said pit.

2. The invention in accordance with claim 1, further comprising means responsive to the end of the signal from said sensing means to close said louvers on said metering unit.

3. The invention in accordance with claim 2, wherein said sensing means is a proximity switch.

4. The invention in accordance with claim 3, wherein said proximity switch is adjustable for sensitivity.

5. The invention in accordance with claim 1, wherein said units are rectangular with sides having sloping surfaces to concentrate the flow of through said louvers.

6. The invention in accordance with claim 1, wherein said means responsive to said signal from said sensing means includes variable timing means.

7. The invention in accordance with claim 1, wherein said means for opening and closing said louvers is a mechanical linkage operated by a cylinder.

8. The invention in accordance with claim 7, wherein said spray means includes a plurality of nozzles connected to an oil source and means for spraying said oil when said louvers on said metering units are open.

9. The invention in accordance with claim 1, wherein said metering units include means for spraying oil on said grain after the grain has passed said louvers.

10. A system for continuously controlling the emission of dust from a pit designed to have grain periodically dumped at high flow rates into the pit comprising:
    a) a pit;
    b) a plurality of units arranged to form a lid on said pit;
    c) said plurality of units, being rectangular in shape, including sides having sloping surfaces to concentrate the flow of grain through said louvers;
    d) said plurality of units, including at least one metering unit and at least one dumping unit;
    e) each of said units having a plurality of louvers;
    f) means on each of said units, including a mechanical linkage on each unit operated by a fluid operated cylinder;
    g) a first portion of the said louvers in said metering unit connected to a first one of said means for opening and closing said louvers, and a second portion of said louvers connected to a second means for opening and closing said louvers;
    h) all said louvers in said dump unit connected to a signal means for opening and closing said louvers;
    i) sensing means to generate a signal when grain is present on said units;
    j) said sensing means located on at least one of said metering units, said sensing means comprising a proximity switch adjustable for sensitivity;
    k) means responsive to said signal from said sensing means to open said louvers on said metering units, including variable timing means to open the said louvers after a predetermined time lapse;
    l) means responsive to the end of the signal from said sensing means to close said louvers on said metering unit;
    m) means to generate a signal for opening all louvers on all units said signal directed and sent to said units for operating all means for opening and closing said louvers in said units; and
    n) means for generating a subsequent signal sent to all of said units to close all of said louvers whereby the dust is prevented from escaping the pit during the unloading of grain into said pit.

11. The method of continuously controlling the emission of dust from a pit designed to have materials periodically dumped at high flow rates into the pit comprising the steps of:

a) forming a lid on said pit of a plurality of units, each unit having a plurality of louvers in a normally closed position;

b) dumping grain from a vehicle on one of said units comprising said lid;

c) accumulating an amount of grain on said one unit sufficient to choke the flow of grain through said unit with grain flowing from said vehicle;

d) opening said louvers on said one of said units;

e) opening all louvers on all units when the grain flow from said vehicle ceases; and f) closing all louvers on all units when all the grain delivered to the units from the vehicle is in the pit.

* * * * *

UNITED STATES PATENT AND TRADEMARK OFFICE
CERTIFICATE OF CORRECTION

PATENT NO. : 5,544,686
DATED : August 13, 1996
INVENTOR(S) : Ken Kearney

It is certified that error appears in the above-indentified patent and that said Letters Patent is hereby corrected as shown below:

Column 6, Claim 5, line 3, after "of", insert --grain--.

Signed and Sealed this

Third Day of December, 1996

Attest:

BRUCE LEHMAN

Attesting Officer

Commissioner of Patents and Trademarks